United States Patent
Weiss

(10) Patent No.: US 11,374,275 B2
(45) Date of Patent: Jun. 28, 2022

(54) ENERGY GENERATING SYSTEM

(71) Applicant: Sol Weiss, Los Angeles, CA (US)

(72) Inventor: Sol Weiss, Los Angeles, CA (US)

(*) Notice: Subject to any disclaimer, the term of this patent is extended or adjusted under 35 U.S.C. 154(b) by 0 days.

(21) Appl. No.: 17/086,663

(22) Filed: Nov. 2, 2020

(65) Prior Publication Data
US 2021/0234216 A1    Jul. 29, 2021

Related U.S. Application Data

(60) Division of application No. 15/140,089, filed on Apr. 27, 2016, now abandoned, which is a continuation-in-part of application No. 14/545,649, filed on Jun. 3, 2015, now abandoned.

(60) Provisional application No. 62/123,854, filed on Dec. 1, 2014.

(51) Int. Cl.
*H01M 14/00* (2006.01)
*H01M 10/08* (2006.01)

(52) U.S. Cl.
CPC ........... *H01M 14/00* (2013.01); *H01M 10/08* (2013.01); *H01M 2220/20* (2013.01); *H01M 2300/0002* (2013.01); *Y02E 60/10* (2013.01)

(58) Field of Classification Search
None
See application file for complete search history.

(56) References Cited

U.S. PATENT DOCUMENTS

| | | | | |
|---|---|---|---|---|
| 2003/0134160 A1* | 7/2003 | Borsuk | ............. | H01M 14/00 429/10 |
| 2008/0038609 A1* | 2/2008 | Yoshizawa | ......... | H01M 8/0267 429/434 |
| 2011/0027621 A1* | 2/2011 | Deane | ............. | H01M 10/4264 429/7 |
| 2011/0210282 A1* | 9/2011 | Foley | ................ | B82Y 25/00 252/62.51 R |
| 2016/0290223 A1* | 10/2016 | Mills | ................ | F02B 51/02 |

FOREIGN PATENT DOCUMENTS

CN         105470594      * 4/2016

* cited by examiner

*Primary Examiner* — Lisa S Park
(74) *Attorney, Agent, or Firm* — Avyno Law P.C.

(57) ABSTRACT

The invention provides an energy generating system that includes ferromagnetic crystals in solution providing for improved longevity and operability at below zero temperatures and exhibiting superconductivity.

12 Claims, 1 Drawing Sheet

ENERGY GENERATING SYSTEM

CROSS-REFERENCE TO RELATED APPLICATIONS

This application is a divisional of U.S. application Ser. No. 15/140,089, filed on Apr. 27, 2016, titled ENERGY GENERATING SYSTEM, which application is a continuation-in-part application and claims and priority of U.S. application Ser. No. 14/545,649, filed on Jun. 3, 2015, titled REMODEL CRYSTALLINE STRUCTURES OF ATOMIC AND MOLECULAR ELEMENTS AT LOW TEMPERATURE LEVELS, that claims priority under 35 U.S.C. § 119(e) of U.S. Provisional Patent Application No. 62/123,854, filed on Dec. 1, 2014, all applications of which are incorporated by reference herein in this application in their entirety.

FIELD OF THE INVENTION

The present invention relates to novel energy generating systems exhibiting superconductivity, and in particular to improved batteries containing ferromagnetic crystals in solution and an electron generating source.

BACKGROUND OF THE INVENTION

The world's major countries are in a race to find chemical solutions for use in batteries, that are practical and safe: non-inflammable, non-explosive, non-lethal, yet also strong and readily available at reasonable cost. The single crystal solid ("mono crystal") is a material in which the crystal lattice is continuous and unbroken. The absence of defects associated with grain boundaries can give mono-crystals unique properties, particularly mechanical, optical and most importantly, electrical and electronic. Furthermore, techniques such as scanning tunneling microscopy are only possible on surfaces of mono-crystals. In superconductivity, there have been cases of materials where superconductivity is only seen in a mono-crystalline specimen.

Batteries may not perform as needed when subjected to extreme cold, chemicals, other equipment and the environment in general. For example, commercial wet cell automobile batteries are only guaranteed for temperatures down to 0° C. or 32° F. (the freezing temperature of water). This has provided challenges for electrical car manufacturers for operating the cars in below zero temperatures. The ability of an automobile battery to deliver current is dependent on temperature. At low temperatures, chemical activities are greatly reduced. The sulfuric acid in the battery cannot work as actively on the lead plates, rendering the battery less efficient and unable to supply optimal amounts of current for less time than at higher temperatures.

Table 1 below, provides the relationship of a typical automobile battery's approximate efficiency according to battery temperature.

TABLE 1

| Efficiency (%) | Battery temperature (° C.) |
|---|---|
| 100 | 26.7 |
| 65 | 0 |
| 50 | −17.8 |
| 10 | −42.8 |

Much interest has been generated regarding the ability of a material to become a superconductor. Superconductivity is a state with exactly zero electrical resistance and expulsion of magnetic fields, occurring in certain materials when cooled below a characteristic critical temperature. For every substance, there is some temperature above which the gas can no longer be liquefied, regardless of pressure. This temperature is the critical temperature ($T_c$), the highest temperature at which a substance can exist as a liquid. Above the critical temperature, the molecules have too much kinetic energy for the intermolecular attractive forces to hold them together in a separate liquid phase. Instead, the substance forms a single phase. The critical temperature for superconductors is the temperature at which the electrical resistivity of a metal or chemical drops to zero. Superconductivity has been found for some material at temperatures above their critical temperature which are known as "high temperature superconductors." An electric current flowing through a loop of superconducting wire can persist indefinitely with no power source and can be stored for thousands of years. Superconductivity has been proposed to be used for electric power transmission, transformers, power storage devices, electric motors and other machines, for medical and for other uses, to produce power safely and at lower costs.

Crystalline compounds for example, copper or zinc sulfate, are used to conduct electrical current. The crystalline structures may become altered or damaged during processing, for example heating, for commercial use Damage may consist of defects in the crystalline structure, resulting in decreased performance. Repair or "healing," also known as "remodeling" of metals has been shown to occur at low temperatures.

There remains a need for improved systems for generating and regenerating energy and for energy storage, which exhibit superconductivity, including for energy generation storage, for use in batteries and other electrical devices, that provide operability and stability at below zero temperatures.

SUMMARY OF THE INVENTION

Accordingly, the present invention provides novel chemical energy systems for energy generation and storage that contain crystalline compounds, and in particular, ferromagnetic crystals, in solution, an electron generating source and which exhibit superconductivity by a new method The crystalline compounds may be ferromagnetic crystals, including but not limited to, zinc sulfate heptahydrate, cobalt chloride, nickel hexahydrate, copper sulfate and/or palladium chloride. The solution may further include graphene nanoplatelets and sodium dodecyl sulfate, and may further include lithium.

The energy system of the invention may be in the form of a device such as a battery containing ferromagnetic crystals in solution, an electron generating source and optionally, including magnets, to strengthen both wet and dry cell mixtures.

The invention further provides a method of enhancing performance of a battery by adding an effective amount of ferromagnetic crystals to a battery solution and dry cells. The ferromagnetic crystals may be zinc sulfate heptahydrate, cobalt chloride, nickel hexahydrate, copper sulfate or palladium chloride. Graphene nanoplatelets and sodium dodecyl sulfate for solubility, may be added to the solution. Optionally, lithium may also be added to the solution.

The invention additionally provides a method for generating and storing energy by providing a source of electrons in a solution containing ferromagnetic crystals.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following FIGURE. The components in the FIGURE are not necessarily to scale, emphasis instead being placed upon illustrating the principles of the invention.

DETAILED DESCRIPTION

Figure 1A:
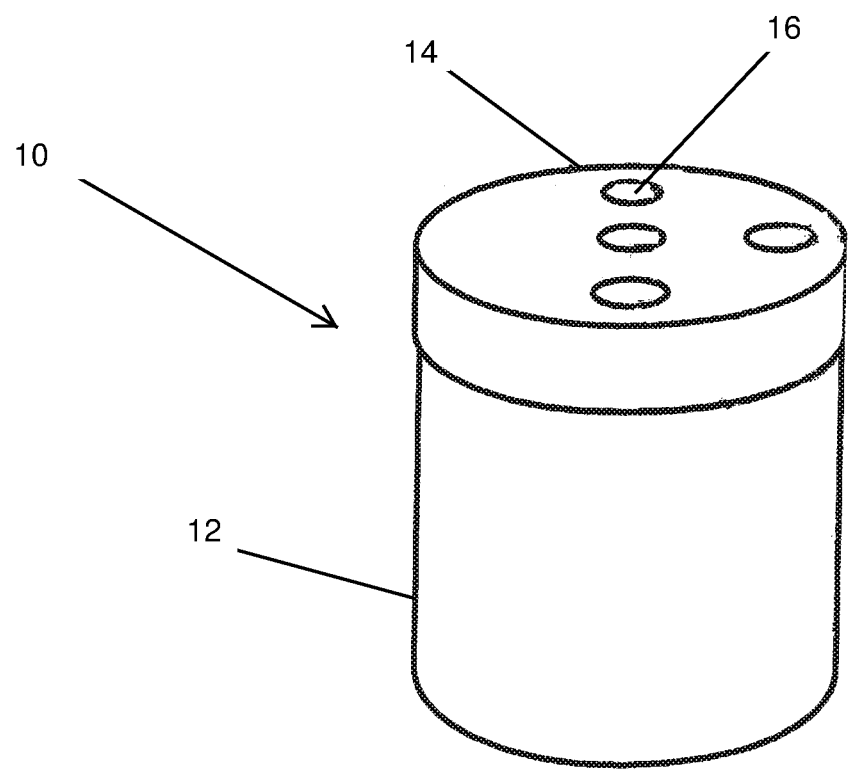
FIGS. 1A and 1B depict a representation of a battery according to an implementation of the invention, including a solution containing ferromagnetic crystals, a lead sheet as the source of elections, and at least one magnet in contact with the solution, as described in detail infra.

The invention provides novel systems for generating and storing energy, for example electrical current, using a solution containing crystalline chemicals that have ferromagnetic properties and an electron source. The invention is based on the discovery that crystalline structures, exposed to low temperatures after being damaged by processing, will remodel or restore to a stronger state. Novel batteries containing ferromagnetic crystal compounds in solution in contact with at least one magnet, were shown at temperatures below zero Centigrade to exhibit enhanced strength and stability, resisting damage, such as alterations of the chemical composition of the solution, and to be able to store energy.

While not being bound by any theory, the crystalline structures in the ferromagnetic compounds in solution may undergo remodeling ("heal") at below zero temperatures (above minus 273° C.)m above the critical temperature of the crystalline compounds, repairing the crystal structures that may have been damaged during commercial processing of the compounds, achieving new properties, including superconductivity. At these temperatures, it is believed that electrons of the crystalline compounds are still able to exhibit motion, in part due to the magnet(s), as opposed to absolute zero, where electron movement is minimal, and that the crystalline structures will begin to remodel or "heal." As a result, damage, for example caused during commercial processing may heal, restoring the properties of the crystal, including the ability to transmit electrical current. The system may be used in batteries, such as automobile batteries, and batteries in other vehicles, including space vehicles, providing long-lasting battery supplied power under extreme temperature conditions. Moreover, because the solutions of the system appear to exhibit superconductivity the solutions of the system, together with magnets, may be used to provide energy without loss due to resistance, in devices for many different applications, including engines.

In an implementation of the invention, crystalline chemicals having ferromagnetic properties are used to form monocrystals in solution that increase in strength, at temperatures below zero ° C. and above their critical temperature. The resulting structures may be charged using permanent magnets, improving the electron flow of the battery solution, resulting in improved strength and thus stability, resisting degradation over time. The result, for example, is a battery than can continue operating in subzero temperatures and will last for longer periods of time. In this implementation, healing and remodeling of a ferromagnetic mono-crystal occur, resulting in renormalized chemicals and metals in the atomic and molecular phases, as demonstrated by exhibiting increases in voltage in temperatures below zero ° C., up to minus 120° C. The solutions of the invention thus provide for greater charging and storage capacity of a battery. In addition, the solutions may provide superconductivity providing a supply of energy that is not decreased by resistance.

The crystalline chemicals having ferromagnetic properties for use in the invention include the crystalline form of zinc sulfate heptahydrate, cobalt chloride, nickel hexahydrate, copper sulfate, palladium chloride and other metallic compounds that form crystals in solution.

Figure 1B:
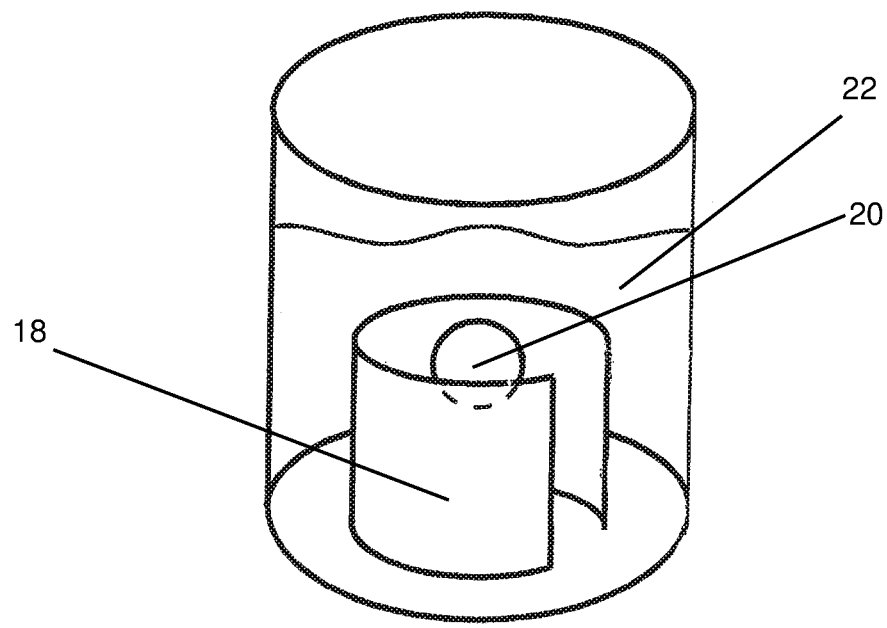

In an embodiment, shown in FIG. 1A, a battery 10 consists of a cylinder 12, which may be made of a metal such as tin, or other material that can withstand extreme cold, having a cap 14 with one or more openings, 16, for a cathode wire, anode wire, thermometer and an extraction wire, to raise the cylinder and cap from a cooling environment, such as liquid nitrogen. As shown in FIG. 1B, inside the cylinder 12 is a curved lead sheet 18 for providing electrons. One or more permanent magnets 20, may be placed inside the curved lead sheet 18 in contact with a chemical solution 22. In addition, one or more magnets (not shown) may be placed externally to the solution, for example on the outside surface of the metal cylinder 12. The solution 22 may be, for example, an acidic battery solution containing sulfuric acid to which is added the crystalline chemicals having ferromagnetic properties forming a ferromagnetic solution. The solution 22 is added to cover the curved lead sheet 18 and magnet 20. The use of magnets is believed to strengthen and stabilize the ferromagnetic solution and to increase the electron movement at low temperatures. In the Examples described below, the battery 10 is submersed in liquid nitrogen to reduce the temperature from below zero ° C. down to minus 120° C.

EXAMPLES

Example I

A solution ("solution A") was prepared containing 1 oz. of zinc sulfate heptahydrate, 2.5 cc of cobalt chloride, 2.5 cc of nickel hexahydrate, 15 cc of 10% w/v copper sulfate and 2.5 cc of 5% w/v palladium chloride in standard battery water.

An anode and a cathode, for example a zinc cathode and copper anode, of a voltage meter are immersed into the solution and used to create a voltage in these examples. Solution A was placed in the cylinder 12 containing the lead sheet 18 and magnet 20 as shown in FIG. 1 and the battery was immersed in liquid nitrogen in a steel tank. The initial voltage of the A solution was 0.7 volts (DC) before immersion in the liquid nitrogen. At minus 81° C., the voltage had increased to 0.8 volts.

Example 2

10 cc of graphene nanoplatelets and 2 cc of 10% sodium dodecyl sulfate were added to Solution A, forming Solution B. The voltage of Solution B before immersion in liquid nitrogen was 0.412 volts with an increase to 0.515 volts at minus 87° C.

Example 3

5 cc of lithium was added to Solution A forming Solution C. The voltage was 0.313 volts before immersion in liquid nitrogen, and subsequently increased to 0.563 volts at minus 81° C.

Example 4

The voltage of Solution A was 0.33 volts before immersion into liquid nitrogen and increased after 5 minutes to 0.60 volts at approximately minus 77.6° C. The voltage of Solution C was 0.29 volts before immersion into the liquid nitrogen and increased to 0.47 volts after 5 minutes at approximately minus 77.6° C.

Example 5

The voltage of Solution C was 0.84 volts before immersion into liquid nitrogen and increased [after 5 minutes?] to 0.951 volts at volts at a temperature of approximately minus 38° C. This was followed by immersion of Solution A with a starting voltage of 0.897 volts into liquid nitrogen, followed by a voltage increase to 0.992 volts, at a temperature of approximately minus 56.6° C.

Example 6

The voltage of Solution B was 0.936 volts before immersion into liquid nitrogen, followed by an increase to a voltage of 0.956 volts at approximately minus 24° C.

Example 7

The voltage of Solution A with the addition of graphene and lithium was 0.88 volts before immersion into liquid nitrogen and increased to 1.2 volts at approximately minus 18.3° C.

Example 8

An additional testing of Solution A produced a reading of 0.98 volts at minus 19.9° C. followed by a reading of 0.5 volts at minus 120° C.

Example 9 Enhancement of Function of Automobile Battery

In this example, 20 ml of battery water from each of three cells of a six cell Duralast battery was removed and combined. The following crystalline chemicals were added to the resulting 60 ml of battery water:
zinc sulfate heptahydrate, 1 tablespoon
cobalt, ½ teaspoon
nickel, ½ tablespoon
copper, 1 tablespoon
palladium, ½ teaspoon The resulting solution was stirred for 30 seconds and 20 ml of the solution was added back into to each of three cells of the battery. The process was repeated for the remaining three cells of the battery. The 120 ml of the crystalline solution of the invention was poured back into each of the battery cells. One 0.7 inch diameter solid disk magnet was placed on an inside wall of each of the six battery cells. A bead sized temperature sensor was installed inside a middle cell of each set of three cells to monitor battery core temperature.

The Duralast battery containing 120 ml of the crystalline solution of the invention, was recharged to 12.49 volts (DC) at ambient temperature. The battery was then placed on dry ice at a starting temperature of approximately minus 109° C., and connected to a 1970 Volkswagen Beetle automobile. At a temperature of minus 46.5° C. the battery started the Volkswagen engine. The voltage during idling of the engine was 14.18 volts. The battery remained on dry ice at minus 109° C. At minus 63° C. the battery voltage was 12.28 volts. The Volkswagen engine failed to start, however the dashboard lights illuminated indicating that there was current from the battery. The battery recovered without recharge to start the Volkswagen engine at 21.8° C., providing a voltage of 12.50 volts, demonstrating that the battery was not damaged by exposure to the subzero temperatures, suggesting the crystalline solution remodeled at the lower temperatures. During the increase to ambient temperature, the voltage of the battery increased to 14.4 volts at minus 20° C., indicating an enhancement in the battery (14.4 volts as compared to the starting 14.18 volts).

The battery was replaced on dry ice and recharged using a commercial automobile battery charger, at three sub-zero temperatures and the following peak voltages were observed:
13.58 volts at minus 30.2° C.
13.52 volts at minus 40.1° C.
15.04 volts at minus 52.6° C.

Thus, at increasingly lower temperatures below zero, the voltage output of the battery increased, demonstrating enhancement of the battery using the solutions of the invention.

Example 10

20 ml of battery water from each of three cells of the six cell Duralast battery was removed and combined as described above in Example 9. To 60 ml of battery water the following crystalline chemicals were added:
zinc sulfate heptahydrate, 1 tablespoon
cobalt, ½ teaspoon
nickel, ½ tablespoon
copper, 1 tablespoon
palladium, ½ teaspoon
graphene, 1 tablespoon
softener, SDS, 2 teaspoons The solution was stirred for 30 seconds. 20 ml of the solution was added to each of three cells. The process was repeated for the remaining six cells. One 0.47 inch disk magnet was added to each cell. In addition, four rectangular magnets were installed on the top of the battery. A bead sized temperature sensor was installed inside a middle cell of each of 3 cells, to monitor battery core temperature. The battery was recharged at ambient temperature and the Volkswagen engine started. The battery was placed on dry ice and connected to the Volkswagen engine. At minus 30.3° C. the Volkswagen engine started. The idle voltage was 14.27 volts. During placement on dry ice, the voltage of the battery momentarily increased at minus 22.3° C. The battery was recharged at minus 46.4° C. The battery voltage peaked at 15 volts.

Example 11

20 ml of battery water from each of three cells of a six cell Duralast battery were removed and combined as described in Example 9. To 60 ml of battery water the following chemicals were added:
zinc sulfate heptahydrate, 1 tablespoon
cobalt, ½ teaspoon
nickel, ½ tablespoon
copper, 1 tablespoon
palladium, ½ teaspoon The solution was stirred for 30 seconds. 20 ml of the solution was added to each of three cells. A bead sized temperature sensor was installed inside a middle battery cell to monitor battery core temperature. The battery was recharged at ambient temperature started the Volkswagen engine. The battery was placed on dry ice and recharged at minus 42.5° C. The battery voltage peaked at 15.02 volts. The battery was then recharged at minus 62.0° C. The battery voltage peaked at 15.10 volts. The battery temperature was brought back to ambient temperature and recharged and started the Volkswagen engine. The battery was then replaced back on the dry ice. At minus 22.4° C. the battery was recharged and the peak voltage was 15.08 volts. At minus 40.7° C. the battery did not start the Volkswagen engine. At minus 43.3° C. the battery was recharged and they peak voltage was 15.17 volts. The battery did not start the Volkswagen engine, however, the radio, windshield wiper motor and headlights turned on demonstrating current was produced by the battery.

Example 12

20 ml of battery water from each of three cells of a six cell battery as described in Example 11 were removed and combined. To 60 ml of battery water the following chemicals were added:
graphene, 1 tablespoon
softener, SDS, 2 teaspoons
The solution was stirred for 30 seconds. 20 ml of the solution was added to each of three cells. A bead sized temperature sensor was installed inside a middle cell to monitor battery core temperature. The battery was recharged at ambient and the Volkswagen started. The battery was placed on dry ice. At minus 40.1° C. the Volkswagen engine did not start, however, the radio, windshield wiper motor and headlights turned on, indicating current was flowing from the battery. The battery was recharged at minus 64.4° C., and the voltage peaked at 15.12 volts. These results demonstrated that maximum battery voltage was reached after recharging.

These results demonstrate that the system and method of the invention enhance the function and stability of novel batteries at subzero Centigrade temperatures. In particular, the results show that at temperatures below the chemicals and crystals' critical temperatures, the crystalline structures are restored and exhibit increases in voltage. Batteries containing the crystalline solutions in contact with a magnet and source of electrons, will not only function at subzero temperatures, but the performance and longevity of the batteries are enhanced.

For commercial use, the crystalline solutions may be brought to the desired subzero temperature, i.e. above the critical temperature.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method of enhancing performance of a battery that includes a chemical energy system for generating and storing energy with lowered resistance that continues to operate in subzero temperature, the method comprising the steps of:
providing a container filled with an acidic battery solution, where the acidic battery solution includes crystalline chemicals having ferromagnetic properties,
providing at least one permanent magnet in the acidic battery solution and at least one permanent magnet external to the battery; and
subjecting the battery to sub-zero temperatures above the critical temperature of the ferromagnetic crystals, whereby the ferromagnetic crystalline chemicals form mono-crystals in solution that improve the electron flow of the battery solution at temperatures below zero degrees Celsius and above the critical temperature of the ferromagnetic crystals, producing a battery that increases in voltage output as temperatures are decreased, and thereby improves battery stability, resisting degradation over time.

2. The method of claim 1 wherein the method enhances the performance of a wet cell battery.

3. The method of claim 1 wherein the ferromagnetic crystals are selected from the group consisting of zinc sulfate heptahydrate, cobalt chloride, nickel hexahydrate, copper sulfate- and palladium chloride.

4. The method of claim 1, further comprising adding graphene nanoplatelets and sodium dodecyl sulfate to the battery solution.

5. The method of claim 1, further comprising adding lithium to the battery solution.

6. The method of claim 1, wherein the solution is brought to sub-zero temperatures by using liquid nitrogen.

7. A method of enhancing performance of a battery containing a battery solution including ferromagnetic crystals, the method comprising the step of:
subjecting the battery to sub-zero temperatures above the critical temperature of the ferromagnetic crystals, where the battery includes:
at least one permanent magnet in contact with the battery solution; and
at least one permanent magnet external to the battery; and
whereby subjecting the battery to sub-zero temperatures above the critical temperature of the ferromagnetic crystals improves the electron flow of the battery solution causing the voltage output of the battery to increase as temperatures are decreased, thereby strengthening the battery.

8. The method of claim 7 wherein the ferromagnetic crystals are selected from the group consisting of zinc sulfate heptahydrate, cobalt chloride, nickel hexahydrate, copper sulfate- and palladium chloride.

9. The method of claim 7, further comprising adding graphene nanoplatelets and sodium dodecyl sulfate.

10. The method of claim 7, further comprising adding lithium to the solution.

11. The method of claim 7, wherein the solution is brought to sub-zero temperatures using liquid nitrogen.

12. A method for generating and storing energy, the steps comprising:
providing a source of electrons in a solution comprising ferromagnetic crystals in contact with at least one magnet where the ferromagnetic crystals are selected from the group consisting of zinc sulfate heptahydrate, cobalt chloride, nickel hexahydrate, copper sulfate and palladium chloride: and
adding either (i) graphene nanoplatelets and sodium dodecyl sulfate to the solution or (ii) lithium to the solution;
subjecting the battery to sub-zero temperatures above the critical temperature of the ferromagnetic crystals, resulting in enhanced battery performance by improve the electron flow of the battery solution and increasing voltage output as temperatures are decreased.

* * * * *